(12) United States Patent
Hupman et al.

(10) Patent No.: US 10,035,477 B1
(45) Date of Patent: Jul. 31, 2018

(54) CORD MANAGEMENT SYSTEM, AND METHODS OF USE AND MANUFACTURE THEREOF

(71) Applicant: Honda Motor Co., Ltd., Tokyo (JP)

(72) Inventors: Matthew J. Hupman, Marysville, OH (US); Neal W. Luginbill, Marysville, HI (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/403,780

(22) Filed: Jan. 11, 2017

(51) Int. Cl.
| | | |
|---|---|---|
| *B60R 11/02* | (2006.01) | |
| *B60R 16/02* | (2006.01) | |
| *H02G 3/38* | (2006.01) | |
| *B60R 11/00* | (2006.01) | |

(52) U.S. Cl.
CPC ...... *B60R 16/0215* (2013.01); *B60R 11/0241* (2013.01); *B60R 11/0252* (2013.01); *H02G 3/38* (2013.01); *B60R 2011/0007* (2013.01); *B60R 2011/0054* (2013.01)

(58) Field of Classification Search
CPC ............. B60R 16/0215; B60R 11/0241; B60R 11/0252; B60R 2011/0007; B60R 2011/0054; H02G 3/38
USPC .......................... 296/24.34, 37.8, 37.12, 37.1
See application file for complete search history.

(56) References Cited

U.S. PATENT DOCUMENTS

| | | | | |
|---|---|---|---|---|
| 5,996,866 | A * | 12/1999 | Susko | B60R 11/0241 224/281 |
| 6,379,178 | B1 * | 4/2002 | Jones, III | H01R 13/60 224/483 |
| 7,505,583 | B2 * | 3/2009 | Rohrbach | G09B 15/00 379/455 |
| 8,104,816 | B2 | 1/2012 | Lupton et al. | |
| 8,137,129 | B2 | 3/2012 | Woods | |
| 8,172,293 | B2 | 5/2012 | Lota et al. | |
| 8,210,589 | B2 | 7/2012 | Penner et al. | |
| 8,256,814 | B2 | 9/2012 | Thorsell et al. | |
| 8,814,243 | B2 * | 8/2014 | Kumblekere | B60R 16/0215 296/24.34 |

(Continued)

FOREIGN PATENT DOCUMENTS

| | | |
|---|---|---|
| CN | 101200173 B | 6/2010 |
| DE | 4216994 C2 | 1/2003 |

(Continued)

*Primary Examiner* — Jason S Morrow
*Assistant Examiner* — E Turner Hicks
(74) *Attorney, Agent, or Firm* — Kenealy Vaidya LLP

(57) ABSTRACT

Some embodiments are directed to a vehicle console for use with an electronic device having a cord. The vehicle console can be disposed adjacent a storage area for storing the electronic device. The vehicle console can include a compartment that is defined by a front portion, a bottom portion, and a back portion, the front and back portions being spaced apart so as to define an open area therebetween, the back portion defining an opening that is contiguous with the storage area such that the opening is configured to receive the cord therethrough, the bottom portion defining a channel that is configured to receive the cord. The vehicle console can also include a port disposed at the front portion of the compartment and configured to connect with the cord. The vehicle console can further include a removable cover overlaid across the channel.

20 Claims, 3 Drawing Sheets

(56) References Cited

U.S. PATENT DOCUMENTS

| | | | |
|---|---|---|---|
| 9,016,752 B2* | 4/2015 | Myers | B60R 7/06 296/24.34 |
| 2007/0124895 A1* | 6/2007 | Brown | A47B 96/00 24/16 PB |
| 2009/0178844 A1* | 7/2009 | Derocher | A47B 97/00 174/500 |
| 2010/0090491 A1* | 4/2010 | Hipshier | B60R 7/04 296/24.34 |
| 2011/0156418 A1* | 6/2011 | Thorsell | B60R 7/04 296/24.34 |
| 2011/0156478 A1* | 6/2011 | Thorsell | B60K 37/04 307/9.1 |

FOREIGN PATENT DOCUMENTS

| | | |
|---|---|---|
| EP | 1650073 A1 | 4/2006 |
| JP | 4285525 B2 | 6/2009 |
| WO | 2016022840 A1 | 2/2016 |

* cited by examiner

CORD MANAGEMENT SYSTEM, AND METHODS OF USE AND MANUFACTURE THEREOF

BACKGROUND

The disclosed subject matter relates to cord management systems, and methods of use and manufacture thereof. More particularly, the disclosed subject matter relates to methods and apparatus that impede electronic device cords from tangling.

Vehicle center consoles, particularly consoles with ports for connecting with electronic devices, enhance passenger convenience by providing means to power, provide input to and/or receive output from electronic devices within the vehicle interior. Storage areas in the consoles are used to store electronic devices within the vehicle interior, and these areas can be near the ports to provide convenient storage while connecting the devices to the ports. The consoles can facilitate passenger use of stored, connected devices.

SUMMARY

According to one aspect, a vehicle console is provided for use with an electronic device having a cord. The vehicle console can be disposed adjacent a storage area for storing the electronic device. The vehicle console can include a compartment that is defined by a front portion, a bottom portion, and a back portion. The front and back portions of the compartment can be spaced apart to define an open area therebetween. The back portion of the compartment can have an opening contiguous with the storage area to receive the cord therethrough. The bottom portion of the compartment can define a channel that can receive the cord therein so that the cord may lay along the channel. The vehicle console can also include a port near the front portion of the compartment and configured to connect with the cord. The vehicle console can further include a removable cover overlaid across the channel.

According to another aspect, a vehicle console is provided for use with an electronic device having a cord. The vehicle console can include a storage area configured to accommodate the device. The vehicle console can also include a compartment disposed adjacent the storage device that is defined by a front portion, a bottom portion, and a back portion. The front and back portions of the compartment can be spaced apart to define an open area therebetween. The back portion of the compartment can have an opening contiguous with the storage area to receive the cord therethrough. The bottom portion of the compartment can define a channel that can receive the cord therein so that the cord may lay along the channel. The vehicle console can also include a port near the front portion of the compartment and configured to connect with the cord. The vehicle console can yet further include a removable cover overlaid across the channel.

According to yet another aspect, a method can be provided for arranging a cord in a vehicle console, the vehicle console configured to accommodate an electronic device connected to the cord, the method comprising: connecting an end of the cord to a port in a compartment; placing a length of the cord into a channel formed in a bottom portion of the compartment; inserting another end of the cord through an opening in a back portion of the compartment for connection to the electronic device; and placing a removable cover across the channel.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. Overview

Figure 1:
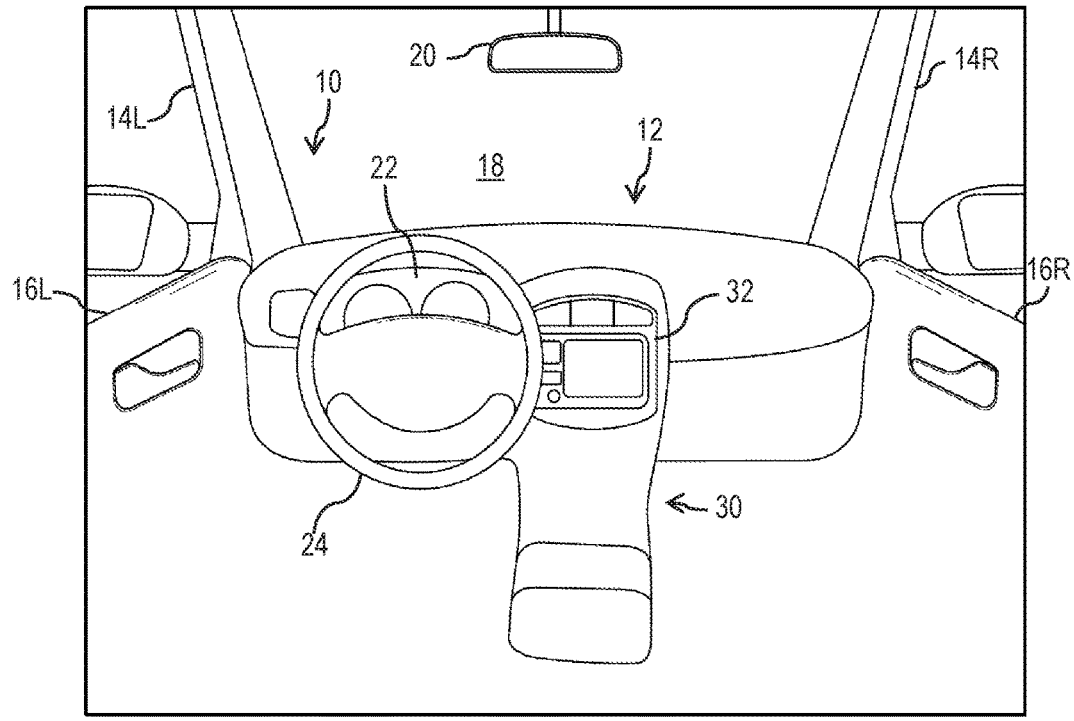
FIG. 1 is a schematic view of a front portion of a passenger cabin of a vehicle in accordance with the disclosed subject matter.

FIG. 1 illustrates an embodiment of a dashboard 12 for a vehicle 10 made in accordance with the principles of the disclosed subject matter. FIG. 1 portrays a view of a portion of a passenger compartment of the vehicle 10. FIG. 1 illustrates a view toward the front of the vehicle 10. The vehicle 10 can include a pair of A-pillars 14L, 14R, a pair of doors 16L, 16R, a windshield 18 and a rearview mirror 20. The dashboard 12 can extend across the passenger compartment of the vehicle 10. The instrument panel assembly 10 can be connected to each of the A-pillars 14L, 14R and/or any other appropriate structure of the vehicle 10 such as but not limited to a firewall.

The dashboard 12 can be divided into a driver portion, a center stack portion and a passenger portion. The driver portion and the passenger portion can be aligned with the driver seat and the front passenger seat, respectively. The center stack portion can extend from the driver portion to the passenger portion. The center stack portion can extend toward the floor of the vehicle 10. Embodiments are intended to include a center stack portion that can extend to and can be integrated with a center console assembly 30 that extends between the driver seat and the passenger seat. Other Embodiments are intended to include a center stack portion that extends to the floor of the vehicle 10, or alternatively, a center stack that terminates before reaching the floor.

The dashboard 12 can include an instrument cluster 22, a steering assembly 24 and a control panel assembly 32.

The instrument cluster 22 can be housed in a cowl of the instrument panel dashboard 12. The instrument cluster 22 can include at least one display that can depict at least one operating condition of the vehicle 10, such as but not limited to vehicle speed, engine speed, fuel level, engine coolant temperature, engine oil pressure, engine oil temperature, boost pressure, odometer mileage, trip odometer mileage, turn signal use, high beam use, warning lights/messages, etc.

The control panel assembly 32 can be mounted on the center stack portion of the dashboard 12. The control panel assembly 32 can include at least one of a dial, switch, and lever configured to permit the selection of a plurality of settings for an HVAC system (also referred to as a heating, ventilation and air condition system), and an entertainment system (such as but not limited to a radio, a CD-player, an infotainment system, an internet access device, a navigation system, a video playback device, etc.). The control panel assembly 32 can include a display screen configured to indicate the status of one or both of HVAC system and the entertainment system. Embodiments are intended to include a display screen configured as a touch screen display, and any number of the dials, switches or levers of the control panel can be replaced or duplicated by the touch screen display.

II. Center Console Assembly

Figure 2:
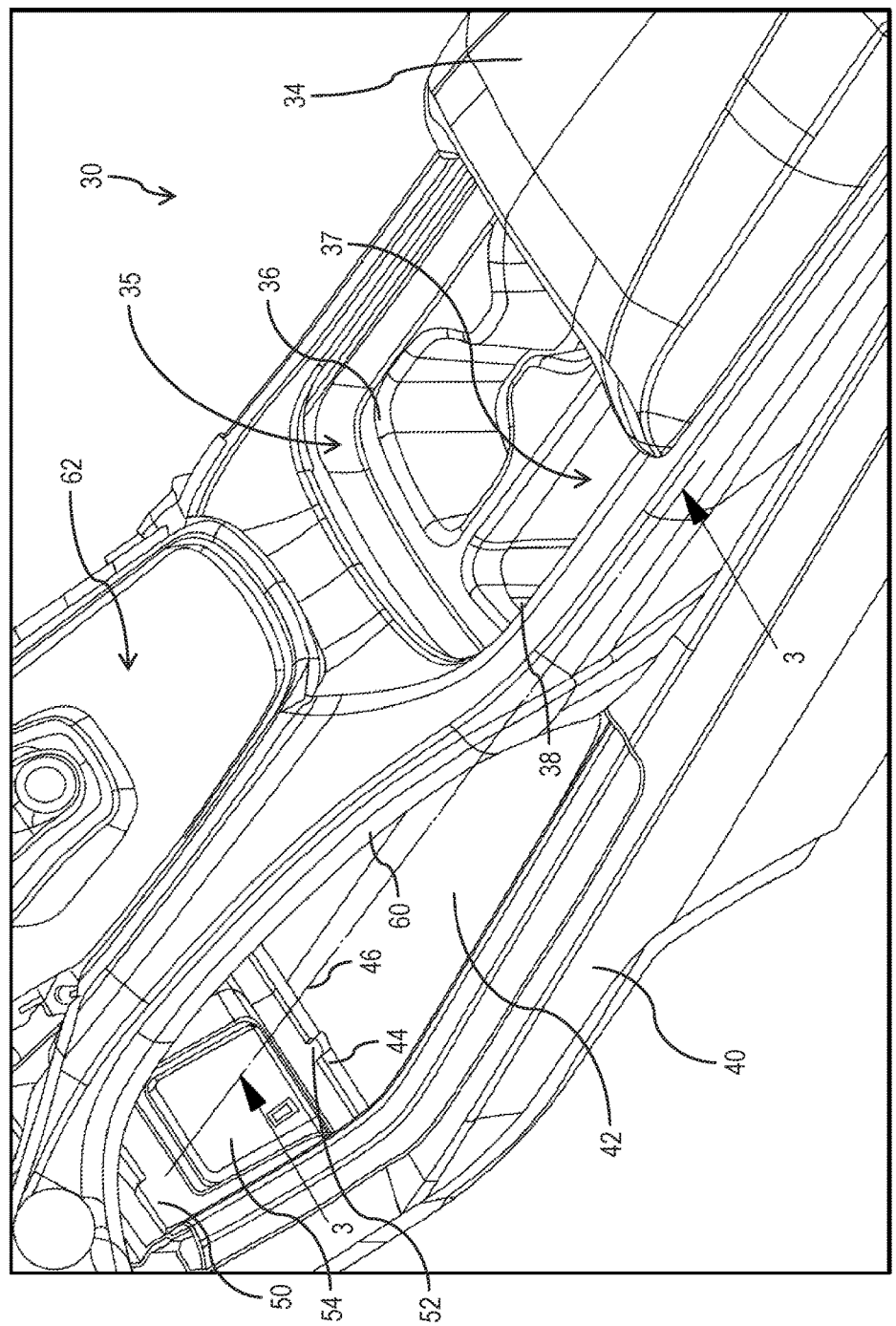
FIG. 2 is a detailed perspective view of an exemplary center console in accordance with the disclosed subject matter.
Figure 3:
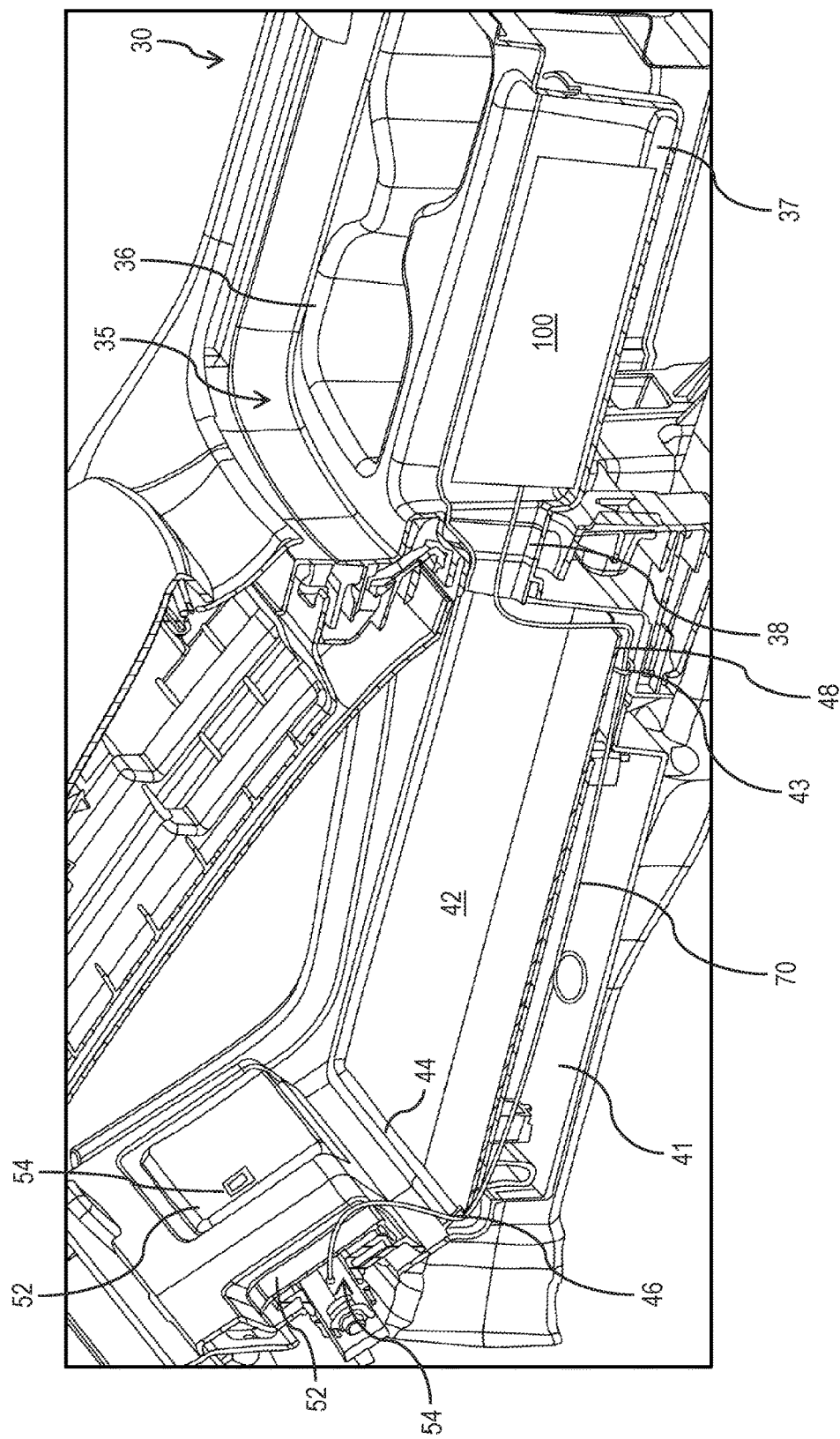
FIG. 3 is a cross-section of the detailed perspective view of the center console of FIG. 2.

Referring to FIGS. 2 and 3, the center console assembly 30 can include a lower console portion 40, an upper console portion 60 and a storage area 35. The lower console portion 40, the upper console portion 60 and the storage area 35 can be integrally or unitarily formed as a single, homogenous unit by any appropriate process, such as but not limited to die casting, extrusion, molding, stamping, etc., and from any appropriate material, such as but not limited to steel, aluminum, magnesium, titanium, carbon fiber, plastic, fiber reinforced plastic, etc. However, embodiments are intended to include center console assembly 30 formed by any appropriate number of components that can be formed from any appropriate process discussed above using any appropriate material discussed above. The center console assembly 30 can also include an armrest 34.

The upper console portion 60 can be disposed above the lower console portion 40 and extend rearward into the passenger cabin from the center stack portion of the dashboard 12. The upper console portion 60 can form a bridge over the open area formed by the lower console portion 40. The upper console portion 60 can include control inputs 62 for operations including at least one of a dial, switch, and lever configured to permit the selection of a plurality of settings for an HVAC system (also referred to as a heating, ventilation and air condition system), and an entertainment system (such as but not limited to a radio, a CD-player, an infotainment system, an internet access device, a navigation system, a video playback device, etc.). The control inputs 62 can be configured to communicate with the control panel assembly 32 to control a display screen configured to indicate the status of one or both of HVAC system and the entertainment system. The control inputs 62 can also include vehicle operations controls including at least one of engine stop/start and driving mode (e.g., traction control, stability control, suspension setting, throttle setting, etc.). The upper console portion 60 can additionally include storage compartments for various items and devices.

The lower console portion 40 can be disposed below the upper console portion 60 and extend rearward into the passenger cabin from the center stack portion of the dashboard 12. The lower console portion 40 can be defined by a front portion, a bottom portion and a back portion while being accessible from sides.

The front portion can include a forward wall 50 extending approximately between the lower console portion 40 and the upper console portion 60 at an angle. The angled slope of the forward wall 50 can vary, and in some embodiments the forward wall 50 can extend perpendicular to the lower console portion 40 or the upper console portion 60. The forward wall 50 can include a port panel 52 with a port 54.

The port panel 52 can be removable to enable access to components covered by the forward wall 50 that are associated with the port 54. Referring to FIG. 3, the port 54 can be a power outlet configured as USB or 12V ACC socket, for example, such that a cord 70 can communicate (i.e., connect) with the port 54 to provide power to an electronic device 100. The port 54 can alternatively be a media port such as for auxiliary input, for example. In such embodiments, the cord 70 can instead be an auxiliary cord or any other media cord configured for connection between the vehicle 10 and the electronic device 100. The electronic device 100 to which the cord 70 can connect can be stored in a device compartment 37 adjacent the back portion of the lower console portion 40. This configuration can necessitate the cord 70 running from the port 54 to the device compartment 37, as shown in FIG. 3 and described in detail below. The port panel 52 can also include two, three, four, five, etc. ports of varying dimensions and specifications.

The bottom portion can define a recessed channel 41 extending along a rectangular tray-like portion for receiving lengths of the cord 70 running between the port 54 and the device compartment 37. The tray-like portion can be planar and extend from the front portion to the back portion, with the channel 41 having sufficient depth and width to accommodate excess lengths of the cord 70 running between the port 54 and the device compartment 37. Specifically, since the cord 70 may be longer than a distance from the port 54 to the device compartment 37 adjacent the back portion, excess lengths of the cord 70 can be looped or doubled-back on each other and stored in the channel 41. The channel 41 can thereby impede lengths of the cord 70 from being tangled or uncontrolled in the passenger cabin. Furthermore, the bottom portion can be disposed below the front portion such that the cord 70, when plugged into the port 54, runs downward and into the channel 41. Lengths of the cord 70 can then extend rearward along the channel 41 towards the back portion of lower console portion 40. The channel 41 thereby provides a pathway to guide the cord 70 from the port 54 to the back portion of the lower console portion 40 and into the device compartment 37.

The channel 41 of the bottom portion can have a retention hook 43 to secure one or more lengths of the cord 70 in the channel 41. The hook 43 can be open or closed to facilitate engagement and disengagement with the cord 70, and can be disposed on a bottom surface of the channel 41. The hook 43 can help hold the cord 70 in place while a channel cover 42 is replaced over the channel 41, as shown in FIG. 3 and described in detail below. Some embodiments can have multiple hooks disposed within the channel 41, including two, three, four, five, etc., while other embodiments may not include any hooks.

A removable channel cover 42 can be overlaid across the channel 41 to cover the channel 41 and the lengths of the cord 70 disposed therein. The channel cover 42 can thereby cover the tray-like portion of the bottom portion extending from the front portion to the back portion. The removable channel cover 42 can be a rubber mat having lips configured as alignment edges 44 along the sides adjacent the front and back portions of the lower console portion 40. The channel cover 42 can alternatively be plastic, metal, or any other suitable material for removably covering the channel 41. The alignment edges 44 are configured to abut adjacent sides of the front and back portions to align the channel cover 42 in the tray-like portion over the channel 41. Additionally, the alignment edges 44 impede dislodging or misalignment of the channel cover 42, which may otherwise expose the channel 41 and cord 70 disposed therein. The alignment edges 44 can have a front cutout 46 and a rear cutout 48 formed as notches in corresponding portions, the front and rear cutouts 46,48 configured for the cord 70 to pass therethrough. Specifically, the front cutout 46 is configured for the portion of the cord 70 running from the port 54 to the channel 41 to pass therethrough, and the rear cutout 48 is similarly configured for the portion of the cord 70 running from the channel 41 to the device compartment 37 to pass therethrough. The front and rear cutouts 46,48 enable the channel cover 42 to lie flat across the tray-like portion of the bottom portion and cover the channel 41.

The channel cover 42 can be configured to be removable from the tray-like portion of the bottom portion to accommodate placement and removal of the cord 70 from the channel 41. Because the cord 70 may not be a permanent fixture in the center console assembly 30, and it may be desirable to unplug the cord 70 from the port 54, the channel cover 42 can be lifted from the tray-like portion to reveal the channel 41. With the channel 41 revealed, the portion of the cord 70 disposed therein can similarly be removed and the channel cover 42 then replaced overtop the channel 41. The channel cover 42 can have an upper surface that is approximately planar for placement and storage of items thereon.

The back portion of the lower console portion 40 defines a planar wall extending upward from the bottom portion to the upper console portion 60. The back portion can extend upward at approximately a right angle from the bottom portion, or alternatively can extend upward at acute or obtuse angles. The back portion defines a cord tunnel 38 therein, the cord tunnel 38 extending through to the device compartment 37. The cord tunnel 38 can be an opening wider than the width of the cord 70 to accommodate a portion of the cord 70 when connected to the electronic device 100 stored in the device compartment 37. The cord tunnel 38 can be disposed in the back portion of the lower console portion 40 above the bottom portion so that the cord 70 can run upward from the channel to the cord tunnel 38 and through to the device compartment 37. Other configurations of the back portion may define the cord tunnel 38 substantially level with the bottom portion of the lower console portion 40.

The storage area 35 can include the aforementioned device compartment 37 as well as cup holder 36, which may have space for one, two or more cups or beverage containers to be placed therein. The storage area 35 can have a lip surrounding the device compartment 37 and the cup holder 36, which may be recessed below the lip. The cup holder 36 and the device compartment 37 can be disposed adjacent one another in a horizontal direction while each extends rearward in a longitudinal direction. The cup holder 36 and the device compartment 37 can have similar or varying dimensions, such as depths, so that each may accommodate appropriate items therein. For example, the device compartment 37 may have sufficient depth to accommodate the electronic device 100 therein, with the electronic device 100 being (positioned horizontally on its side or vertically on its base or top) within the device compartment 37. The device compartment 37 may also have sufficient width and length to accommodate the electronic device 100 therein. The electronic device 100 can be configured as a cellphone, smartphone, tablet, e-reader, e-watch, etc. and the device compartment 37 can therefore have appropriate dimensions to accommodate the electronic device 100 therein.

The device compartment 37 can be formed rearward of and adjacent the back portion of the lower console portion 40 such that the cord tunnel 38 can extend contiguously from the back portion to the device compartment 37. Specifically, the cord tunnel 38 extends rearward from the back portion of the lower console portion 40 to a front wall of the device compartment 37. As discussed above, the cord tunnel 38 is configured such that the cord 70 can pass therethrough and connect to the electronic device 100 while the device 100 is being stored in the device compartment 37. The device 100 can be oriented in the device compartment 37 such that a port on the device 100 for charging or receiving other input can be located near the front wall and the cord tunnel 38. This orientation promotes efficient use of the cord 70 while avoiding excess lengths of the cord 70 running along the lower console portion 40 or through the cord tunnel 38 and device compartment 37. Additionally, the opening in the front wall of the device compartment 37 defined by the cord tunnel 38 can be sufficiently dimensioned to accommodate a corresponding head of the cord 70. The cord 70 can have a head adapted to connect the cord 70 to the electronic device 100, and the cord tunnel 38 can be dimensioned such that the head can pass therethrough unimpeded for connecting with the electronic device 100.

The storage area 35 can also be disposed forward of the armrest 34 so that a passenger in the vehicle 10 can rest their arm or hand on the armrest 34 while accessing the device compartment 37. The armrest 34 can thereby offer enhanced convenience and comfort for the passenger utilizing the device compartment 37 and connecting the cord 70 to the electronic device 100. Other embodiments may include structures other than the armrest 34 adjacent the storage area 35, such as additional storage compartments, entertainment units, etc.

III. Method of Arranging

The present embodiment of the center console assembly 30 can be configured so that a cord such as the cord 70 can be arranged to connect the electronic device 100 to the port 54 while the device 100 is stored away from the port 54. The center console assembly 30, specifically the lower console portion 40, is thereby configured to route the cord 70 from the port 54 to the electronic device 100 without the cord 70 becoming tangled and/or unwieldy.

Arrangement of the cord 70 can include connecting an end of the cord 70 to the port 54 in the port panel 52 of the forward wall 50. As discussed above, the end of the cord 70 can be a USB or 12V ACC adapter, or alternatively can be a media adapter for media input to the vehicle 10 rather than for powering the electronic device 100.

From the port 54, the cord 70 can extend downward into the channel 41 defined by the bottom portion of the lower console portion 40, the channel 41 being exposed once the channel cover 42 has been removed. Extra lengths of the cord 70 can be looped and overlapped back on each other in the channel 41 to ensure excess lengths are not running up from the channel 41 to the device compartment 37, which could then become intrusive to passengers.

With an appropriate length of the cord 70 remaining for connection to the electronic device 100 in the device compartment 37, the unconnected end of the cord 70 extends upward from the channel 41 to the back portion of the lower console portion 40. With both ends of the cord 70 disposed above the channel 41 and lengths of the cord 70 running through the channel 41, the channel cover 42 can be replaced overtop of the tray-like bottom portion of the lower console portion 40. To properly fit the channel cover 42, alignment edges 44 are used to abut adjacent edges of the tray-like bottom portion to ensure the channel cover 42 is fitted properly. Furthermore, the portions of the cord 70 extending into and out of the channel 41 can be fit into the front and rear cutouts 46,48 in the corresponding alignment edges 44 of the channel cover 42. The front and rear cutouts 46,48 facilitate undisturbed fitment of the channel cover 42 by preventing the channel cover 42 from sitting up on the portions of the cord 70 extending into and out of the channel 41.

The portion of the cord 70 extending out of the channel 41 opposite the port 54 can be inserted into the opening in the back portion of the lower console portion 40. Specifically, the portion of the cord 70 can be inserted into the opening and through the cord tunnel 38 to the device compartment 37. With the unconnected end of the cord 70 disposed in the device compartment 37, the electronic device 100 can then be connected thereto. Once connected, the electronic device 100 can receive or send signals to the vehicle 10 through the cord 70 to either receive power or transmit information.

The above described method of arranging the cord 70 through the center console assembly 30 of the vehicle 10 assists in managing lengths of the cord 70 to prevent the cord 70 from becoming tangled and unwieldy while still providing connection. Additionally, the cord 70 can remain so arranged even when the electronic device 100 is not stored in the device compartment 100 to ensure that a connection to the port 54 is readily available to an occupant, such as a driver or passenger.

The steps of the arranging method listed above may be performed in any order, such as by connecting the cord 70 to the port 54 first or alternatively connecting the cord 70 to the device first.

IV. Alternative Embodiments

While certain embodiments of the invention are described above, and FIGS. 1-3 disclose the best mode for practicing the various inventive aspects, it should be understood that the invention can be embodied and configured in many different ways without departing from the spirit and scope of the invention.

For example, embodiments are disclosed above in the context of a cord management system, specifically a system for passing a cord from one compartment to another, configured for a vehicle as shown in FIGS. 1-3. However, embodiments are intended to include or otherwise cover cord management systems configured for any type of vehicle.

Some embodiments of the cord management system can be configured for use with multiple cords extending from one compartment to another, and the cords may be of the same or different types. For example, some embodiments may include multiple cords extending from power ports or sockets at a forward portion of the vehicle extending rearward through the channel and cord tunnel to the device compartment for connection to respective devices. In these embodiments, both the channel and tunnel can be appropriately dimensioned to accommodate the multiple cords extending therethrough. Other embodiments may include multiple different types of cords, such as for example a cord and an auxiliary cord for simultaneous connection to an electronic device requiring connection to a power source and connection to a media input.

Other embodiments may also feature a center console assembly that is configured differently so as to not have open accessible sides, like the lower console portion shown in FIGS. 2-3. The center console assembly may alternatively be completely closed on all sides by walls and the cords may be inserted through and routed in the cord management system nonetheless. In such a configuration, the closed console assembly may still have a removable floor under which the cord can be stored in the channel.

In the present embodiment described above, the cord is routed in a predominantly rearward direction from the port or socket to the device compartment in which the electronic device is stored. However, other embodiments may route the cord in substantially forward direction, or even horizontal direction from side-by-side compartments. Various vehicles include ports and sockets in different compartments located in different areas of the vehicle, and the disclosed cord management system can be implemented to route the cord from any compartment in the vehicle to a storage area in which a device may be stored and used. In embodiments in which the port or socket is disposed proximate the cup holders or armrest storage area, and a forward portion of the console assembly has shelving or storage for a device, it may be desirable to route the cord from the port or socket forward to the device storage area.

Other embodiments of the cord management system may include multiple hooks or catches for the cord(s) to be routed through to ensure the cord(s) maintains proper placement in the system. The cord(s) can be secured not only within the channel but also along front and back portions of the center console assembly, as well as through the tunnel and in the device compartment. Specifically, the adapter head of the cord can be secured within the device compartment to ensure that the cord is not pulled out through the tunnel and away from the device compartment unintentionally. This would facilitate consistent accessibility of the cord within the device compartment, despite movement within the passenger area of the vehicle that may otherwise dislodge the cord and pull it back through the tunnel away from the device.

As disclosed above, embodiments are intended to be used with any type of vehicle. The power source of the vehicle can be an internal combustion engine, an electric motor, or a hybrid of an internal combustion engine and an electric motor. The power source configured as an internal combustion engine or a hybrid power source can have the engine output axis oriented in the longitudinal direction or in the traverse direction of the vehicle. The engine can be mounted forward of the front axles, rearward of the rear axles, or intermediate the front and rear axles.

The vehicle can include any type of transmission, including an automatic transmission, a manual transmission, or a semi-automatic transmission. The transmission can include an input shaft, an output shaft, and a speed ratio assembly.

Embodiments are also intended to include or otherwise cover methods of using and methods of manufacturing any or all of the elements disclosed above. The methods of manufacturing include or otherwise cover processors and computer programs implemented by processors used to design various elements of the cord management system disclosed above.

While the subject matter has been described in detail with reference to exemplary embodiments thereof, it will be apparent to one skilled in the art that various changes can be made, and equivalents employed, without departing from the scope of the invention. All related art references discussed in the above Background section are hereby incorporated by reference in their entirety.

What is claimed is:

1. A vehicle console for use with an electronic device having a cord, the vehicle console being disposed adjacent a storage area for storing the electronic device, the vehicle console comprising:

a compartment that includes a front portion, a bottom portion, and a back portion, the front and back portions being spaced apart so as to define an open area therebetween, the back portion includes a cord tunnel that extends through the back portion and opens at each of the storage area and the open area such that the cord tunnel is configured to receive the cord therethrough, and the bottom portion defining a channel that is configured to receive the cord;

a port disposed at the front portion of the compartment and configured to connect with the cord; and a removable cover overlaid across the channel.

2. The vehicle console of claim 1, wherein the channel extends from the front portion of the compartment to the back portion.

3. The vehicle console of claim 2, wherein the channel is recessed in the bottom portion of the compartment such that the removable cover is configured to lie flat across the channel and conceal the cord.

4. The vehicle console of claim 3, wherein the channel has sufficient depth and width to accommodate additional excess lengths of the cord.

5. The vehicle console of claim 2, wherein the removable cover extends approximately from the front portion of the compartment to the back portion.

6. The vehicle console of claim 5, wherein the removable cover has a notch cut in edges adjacent the front and back portions of the compartment, each of the notches configured for the cord to pass therethrough.

7. The vehicle console of claim 1, wherein the channel includes a retention hook disposed therein and configured to secure the cord.

8. The vehicle console of claim 1, wherein the opening in the back portion of the compartment extends proximate an armrest.

9. The vehicle console of claim 1, wherein the opening in the back portion of the compartment has edges configured to restrict movement of the cord.

10. The vehicle console of claim 1, wherein the channel in the bottom portion of the compartment is disposed below the port in the front portion of the compartment and the opening in the back portion of the compartment.

11. A vehicle console for use with an electronic device having a cord, the vehicle console comprising:
a pair of side walls spaced apart from each other;
a storage area configured to accommodate the electronic device;
a compartment disposed between the side walls and adjacent the storage device, the compartment is defined by a front portion, a bottom portion, and a back portion, the front and back portions being spaced apart so as to define an open area therebetween, the back portion defining an opening that is contiguous with the storage area such that the opening is configured to receive the cord therethrough, the bottom portion defining a channel that is configured to receive the cord;
a port disposed at the front portion of the compartment and configured to connect with the cord; and
a removable cover overlaid across the channel, the removable cover extends from the front portion to the back portion, and the removable cover extends from one of the side walls to a different one of the side walls.

12. The vehicle console of claim 11, wherein the channel and the removable cover each extend approximately from the front portion of the compartment to the back portion.

13. The vehicle console of claim 12, wherein the channel is recessed in the bottom portion of the compartment such that the removable cover is configured to lie flat across the channel and conceal the cord.

14. The vehicle console of claim 13, wherein the channel has sufficient depth and width to accommodate additional excess lengths of the cord.

15. The vehicle console of claim 14, wherein the removable cover has a notch cut in edges adjacent the front and back portions of the compartment, each of the notches configured for the cord to pass therethrough.

16. The vehicle console of claim 11, wherein the channel includes a retention hook disposed therein and configured to secure the cord.

17. The vehicle console of claim 11, wherein the opening in the back portion of the compartment extends proximate an armrest.

18. The vehicle console of claim 11, wherein the opening in the back portion of the compartment has edges configured to restrict movement of the cord.

19. The vehicle console of claim 11, wherein the channel in the bottom portion of the compartment is disposed below the port in the front portion of the compartment and the opening in the back portion of the compartment.

20. A method of arranging a cord in a vehicle console, the vehicle console configured to accommodate an electronic device connected to the cord, the method comprising:
connecting an end of the cord to a port in a compartment;
placing a length of the cord into a channel formed in a bottom portion of the compartment;
passing the cord through a cord tunnel extending through a back portion of the compartment and opened at a storage compartment configured to receive the electronic device such that the cord extends from the compartment and into the storage compartment; and
placing a removable cover across the channel.

* * * * *